(12) United States Patent
Katz et al.

(10) Patent No.: US 11,438,494 B1
(45) Date of Patent: Sep. 6, 2022

(54) DEVICE FOR VIEWING AND IMAGING THE SUN AND SOLAR PHENOMENA

(71) Applicant: Graphic Arts Systems Inc., Maple Heights, OH (US)

(72) Inventors: Jordan Katz, Shaker Heights, OH (US); Stewart Nozette, South Euclid, OH (US)

(73) Assignee: Graphic Arts Systems, Inc., Maple Heights, OH (US)

( * ) Notice: Subject to any disclaimer, the term of this patent is extended or adjusted under 35 U.S.C. 154(b) by 0 days.

(21) Appl. No.: 17/187,401

(22) Filed: Feb. 26, 2021

(51) Int. Cl.
*H04N 5/225* (2006.01)
*H04N 5/355* (2011.01)
*G02B 7/00* (2021.01)

(52) U.S. Cl.
CPC ............ *H04N 5/2254* (2013.01); *G02B 7/006* (2013.01); *H04N 5/35581* (2013.01)

(58) Field of Classification Search
CPC .................................................. H04N 5/35581
See application file for complete search history.

(56) References Cited

U.S. PATENT DOCUMENTS

| | | | |
|---|---|---|---|
| 2017/0111075 A1* | 4/2017 | Virolainen | H04B 1/3888 |
| 2018/0206608 A1* | 7/2018 | Wang | A45C 11/22 |
| 2019/0052297 A1* | 2/2019 | Lee | H04B 1/3888 |

OTHER PUBLICATIONS

Bohatch, Emily; "These companies make eclipse glasses certified as safe. Here's where you can find them"; Aug. 2, 2017; p. 1-4 (Year: 2017).*
Lunt Solar Systems; "Lunt Solar Systems Solar Eclipse Glasses"; Jul. 19, 2020; https://web.archive.org/web/20200719024058/https://www.amazon.com/10-Pack-Premium-Certified-Lunt-Solar/dp/B06ZZPRB7L; all pages (Year: 2020).*
Dinodia Photo, Fotostock, https://www.agefotostock.com/age/en/details-photo/a-young-girl-taking-picture-with-cell-phone-and-watches-the-partial-solar-eclipse-by-wearing-a-protected-filter-on-1st-august-2008-in-bombay-mumbai/DPA-ASB-154032; Aug. 1, 2008 (Year: 2008).*
Rebecca O'donnell; "QR codes that last a lifetime"; Sep. 23, 2013; https://www.oemoffhighway.com/engineering-manufacturing/article/11175813/qr-codes-that-last-a-lifetime; all pages (Year: 2013).*

(Continued)

*Primary Examiner* — Gary C Vieaux
(74) *Attorney, Agent, or Firm* — Law Office of Arthur M. Dula; Arthur M. Dula

(57) ABSTRACT

A viewing device adapted to support an imaging device includes a panel defining an imaging aperture to facilitate a capture of an image, by a camera sensor of the imaging device, of solar phenomena, and a viewing window to facilitate a view, by one of the human eyes, of the solar phenomena. The viewing window is arranged distally from a first longitudinal end of the panel relative to the imaging aperture and is arranged laterally offset from the imaging aperture. The viewing device also includes an optical filter attached to the panel and arranged covering the viewing window to filter parasitic light rays, and an engagement member adapted to releasably engage with the imaging device and retain the imaging device with the panel such that the camera sensor is aligned with the imaging aperture. The viewing device uses an authentication identification to eliminate the risk of counterfeiting and preserve safety.

11 Claims, 3 Drawing Sheets

(56) References Cited

OTHER PUBLICATIONS

Boyle, Alan; "T-minus-1 month: Cellphone carriers are gearing up for a solar eclipse Super Bowl"; Jul. 21, 2017; https://www.geekwire.com/2017/solar-eclipse-telecom-carriers/; p. 1. (Year: 2017).*
Cipriani, Jason; "How to photograph the eclipse with your phone"; Aug. 21, 2017; https://www.cnet.com/tech/mobile/how-to-photograph-the-eclipse-with-your-phone/; pp. 1-4. (Year: 2017).*

\* cited by examiner

DEVICE FOR VIEWING AND IMAGING THE SUN AND SOLAR PHENOMENA

TECHNICAL FIELD

The present disclosure relates, generally, to a viewing device, and more particularly relates to a viewing device that facilitates simultaneous viewing and capturing an image of the sun and solar phenomena.

BACKGROUND

Currently, specifically designed glasses, goggles, and hand cards are used to directly view the sun and solar phenomena, such as a solar eclipse, and protect the eyes from harmful solar radiation. However, these eye-wears are made for viewing only, and cannot record the solar events. In the current age, smart phone imaging is ubiquitous. Smart phone cameras do have available sun safe filters that can be installed. However, there is no safe and dependable way to hold the smartphone up to the sun without risking the user's eyes. Also, it is generally difficult to see and hold one's smart phone up to the sun, while wearing a protective eyewear. Therefore, there is a need for a device that can facilitate a simultaneous viewing and imaging of the sun, which also takes eye safety into account.

SUMMARY

In accordance with one embodiment of the present disclosure, a viewing device is disclosed. The viewing device is adapted to support an imaging device having a camera sensor and a display to display an image captured by the camera sensor. The viewing device includes a panel having a first longitudinal end and a second longitudinal end and defines an imaging aperture to facilitate a capture of an image, by the camera sensor, of a solar eclipse. The panel also defines a viewing window to facilitate a view, by one of the human eyes, of the solar eclipse. The viewing window is arranged distally from the first longitudinal end relative to the imaging aperture and is arranged laterally offset from the imaging aperture. Moreover, the viewing device includes an optical filter attached to the panel and arranged covering the viewing window to filter parasitic light rays. Additionally, the viewing device includes an engagement member adapted to releasably engage with the imaging device and retain the imaging device with the panel such that the camera sensor is aligned with the imaging aperture. The viewing device facilitates a simultaneous capturing of the image of the solar eclipse and the viewing of the solar eclipse.

In accordance with another embodiment of the present disclosure, a viewing device is disclosed. The viewing device is adapted to support an imaging device having a camera sensor and a display to display an image captured by the camera sensor. The viewing device includes a panel having a first longitudinal end and a second longitudinal end and defines an imaging aperture to facilitate a capture of an image, by the camera sensor, of a solar eclipse. The panel also defines a viewing window to facilitate a view, by one of the human eyes, of the solar eclipse. The viewing window is arranged distally from the first longitudinal end relative to the imaging aperture and is arranged laterally offset from the imaging aperture. Further, the viewing device includes a first identifier disposed on the panel to enable an authentication of the viewing device. Moreover, the viewing device includes an optical filter attached to the panel and arranged covering the viewing window to filter parasitic light rays. Additionally, the viewing device includes an engagement member adapted to releasably engage with the imaging device and retain the imaging device with the panel such that the camera sensor is aligned with the imaging aperture. The viewing device facilitates a simultaneous capturing of the image of the solar eclipse and the viewing of the solar eclipse.

DETAILED DESCRIPTION

Figure 1:
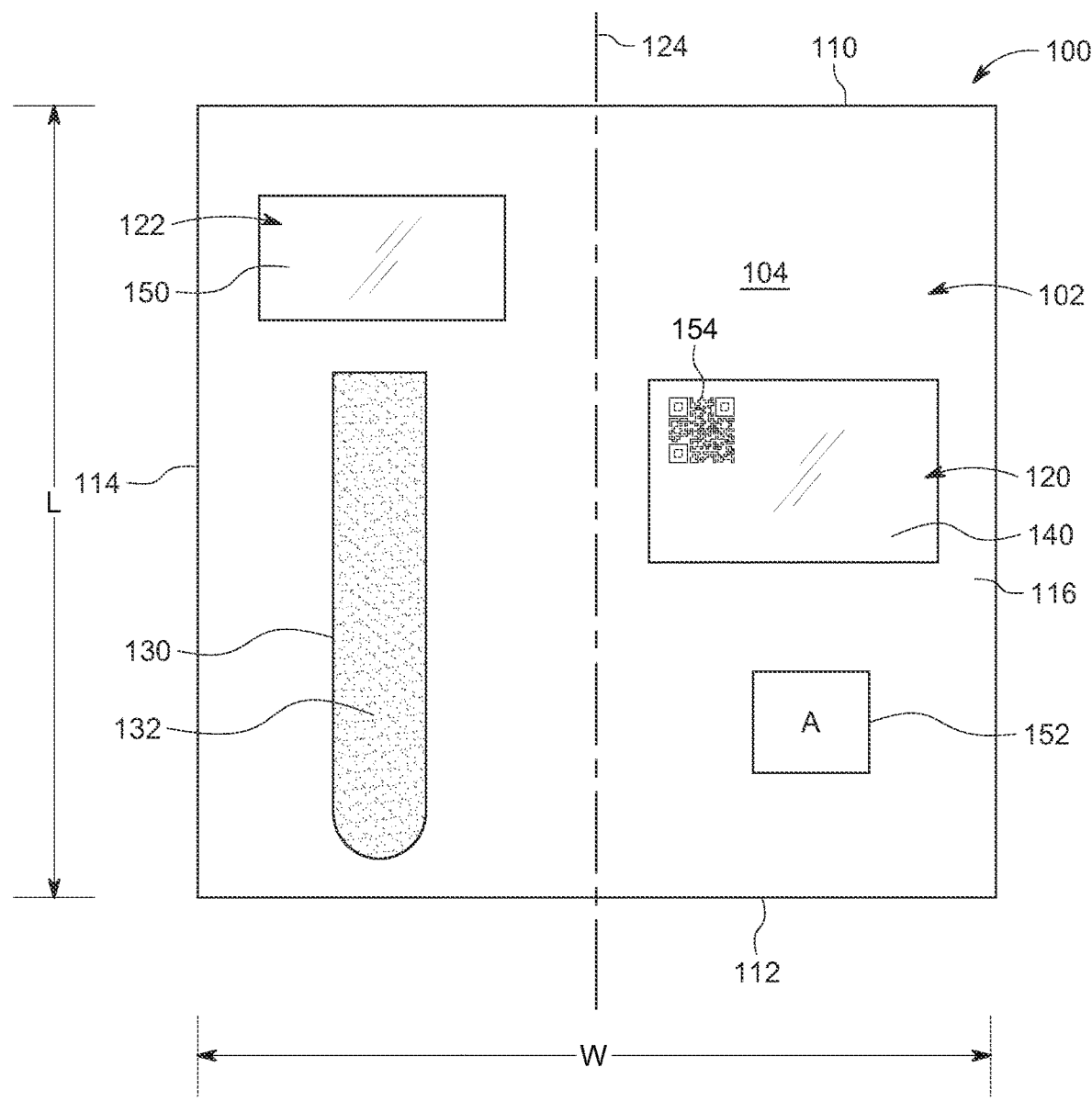
FIG. 1 illustrates a front view of an exemplary viewing device, in accordance with an embodiment of the disclosure.

In the following description, for purposes of explanation, numerous specific details are set forth in order to provide a thorough understanding of the present disclosure. It will be apparent, however, to one skilled in the art that the present disclosure can be practiced without these specific details. In other instances, apparatus and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. The, use of any term should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Figure 2:
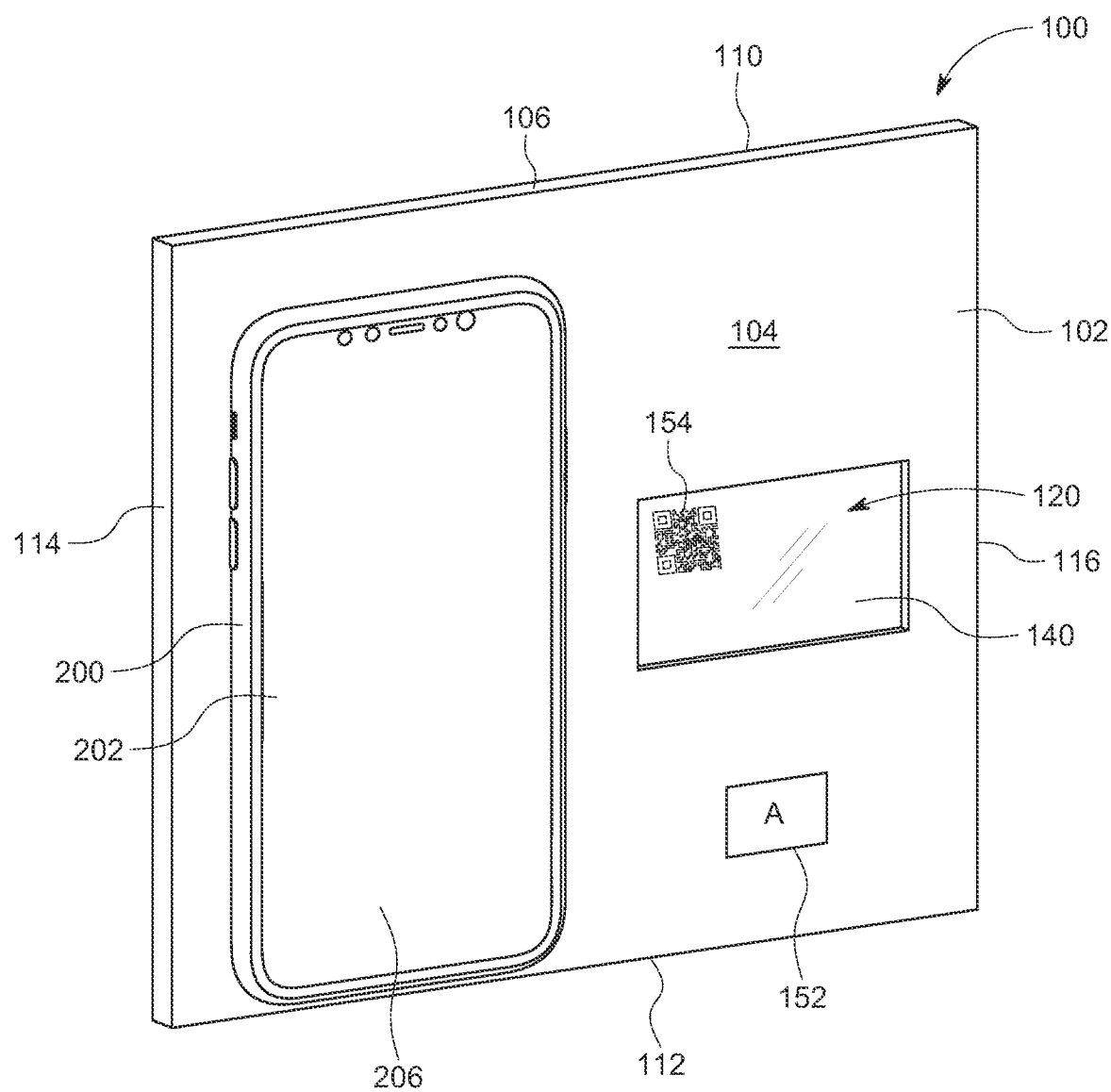
FIG. 2 illustrates a perspective view of the viewing device of FIG. 1 with an imaging device engaged with a panel of the viewing device, in accordance with an embodiment of the disclosure.

Referring to FIGS. 1 and 2, a viewing device 100 that facilitates a simultaneous viewing and imaging of a solar eclipse is shown. The viewing 100 device includes a panel 102, for example, a rectangular flat panel, having a first surface 104, a second surface 106 arranged opposite and parallel to the first surface 104, a first longitudinal end 110 (i.e., top end 110), a second longitudinal end 112 (i.e., bottom end 112) arranged opposite and spaced apart from the first longitudinal end 110, a first lateral end 114, and a second lateral end 116 disposed opposite to the first lateral end 114. Although a rectangular flat panel 102 is shown and contemplates, it may be appreciated that the panel 102 may include an arcuate shape, a square shape, a trapezoidal shape, etc. The panel 102 is adapted to be arranged in front of a user's face for viewing and imaging the solar eclipse such that the first longitudinal end 110 is arranged proximate to a forehead of the user and at least a portion of the panel 102 is arranged directly in front of the forehead, while the second longitudinal end 112 is arranged relatively proximate to a chin of the user and below the eyes of the user. Also, the panel 102 is shaped and sized such that the panel 102 is adapted to cover both the eyes of the user when the panel 102 is arranged in front of the face of the user, while viewing the solar eclipse. Accordingly, the panel 102 includes a length 'L' and a width 'W' so as to completely cover eyes of the user to prevent the eyes of the user from an exposure of solar rays when the viewing device 100 is positioned in front of the user to simultaneously image and view the solar eclipse. In some embodiments, viewing device 100 may include one or more side flaps adapted to move between an extended position and folded position. In the extended position, the one or more side flaps extends outwardly from panel 102 and may cover a space between the panel 102 and the face of the user to prevent a direct exposure of the eyes of the user to the solar eclipse.

As shown in FIG. 1 and FIG. 2, the panel 102 defines an opening, for example, a viewing window 120, extending from the first surface 104 to the second surface 106, and an imaging aperture 122 (shown in FIG. 1) extending from the first surface 104 to the second surface 106. As shown, the viewing window 120 is arranged on a first side, for example, a right side, of a longitudinal central axis 124 of the panel 102, while the imaging aperture 122 is arranged on a second side, for example, a left side of the longitudinal central axis 124 of the panel 102. The viewing window 120 enables a viewing of the solar eclipse, by the eye of the user, and is arranged distally from the first longitudinal end 110 relative to the imaging aperture 122. As shown, the viewing window 120 may be arranged substantially centrally to the length 'L' of the panel 102 to ensure sufficient extension of the panel 102 on both sides of the eye of the user, in a longitudinal direction, to prevent the eyes from an exposure of solar radiations while using the viewing device 100.

Figure 3:
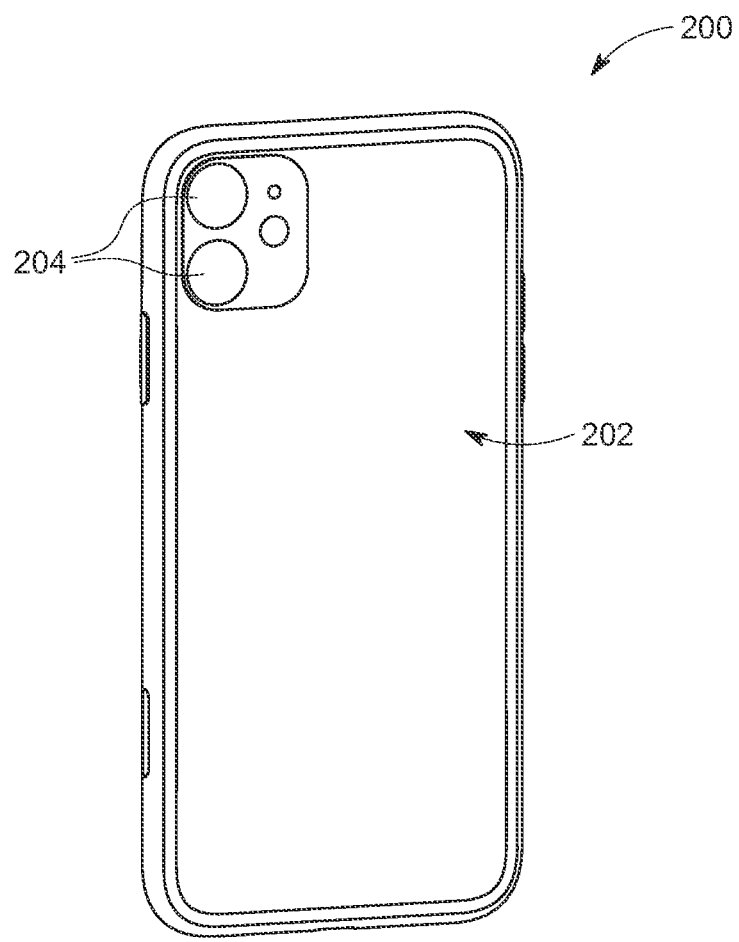
FIG. 3 illustrates a rear view of the imaging device of FIG. 2 depicting a camera sensor of the imaging device, in accordance with an embodiment of the disclosure.

As shown in FIG. 1, the imaging aperture 122 is arranged proximate to the first longitudinal end 110 relative to the viewing window 120 and is disposed laterally offset from the viewing window 120. The imaging aperture 122 facilitates an imaging of the solar eclipse via an imaging device 200. In an embodiment, the imaging device 200 may be a mobile phone 202, such as, a smart phone, having a camera sensor 204 (shown in FIG. 3) and a display 206 adapted to display a scene and/or image captured by the camera sensor 204. The imaging aperture 122 facilitates a transmission of light to the camera sensor 204 from an ambient. It may be appreciated that a position of the imaging aperture 122 is selected so as to enable an alignment of the camera sensor 202 with the imaging aperture 122 when the imaging device 200 is engaged with the panel 102.

To engage and retain the imaging device 200 with the viewing device 100, the viewing device 100 includes an engagement member 130 coupled to the panel 102. As shown, the engagement member 130 may be an elongated adhesive member or strip 132 arranged on the second side of the panel 102 and between the imaging aperture 122 and the second longitudinal end 112 of the panel 102. A length and width of the adhesive strip 132 may be selected to ensure the retention of the imaging device 200 with the panel 102. The adhesive strip 132 may facilitate an adhesive engagement/coupling/attachment of the imaging device 200 with the panel 102 and enables a releasable engagement of the imaging device 200 with the panel 102. In an embodiment, the adhesive strip 132 may be dual side adhesive tape and may be releasably attached to the first surface 104 of the panel 102. Although the engagement member 130 is depicted in the figures as an adhesive strip 132, in embodiments the engagement member 130 may comprise any other suitable engagement element, such as, but not limited to, a magnetic member, a bracket, a Velcro, etc., and may also be utilized for engaging and retaining the imaging device 200 with the viewing device 100.

Additionally, the viewing device 100 includes an optical filter 140 attached to the panel 102 and arranged covering the viewing window 120. As shown, the optical filter 140 completely covers the viewing window 120 and may be attached to the second surface 106 of the panel 102. The optical filter 140 is arranged such that a light incident on the optical filter 140 is transmitted through the optical filter 140 to the eye of user through the viewing window 120. In an embodiment, the optical filter 140 is a solar filter which is at least partially transparent so that at least part of light incident on the optical filter 140 may be transmitted through the optical filter 140.

In one embodiment, the optical filter 140 may be a polarization filter selectively transmitting the incident light on the basis of its polarization state. The polarization filter may be, for example, a linear polarization filter transmitting linearly polarized light, a circular polarization filter producing circularly polarized transmitted light, or a cross polarization filter changing the polarization orientation of incident, linearly polarized light perpendicular to the initial orientation. Accordingly, the optical filter 140 is selected such that the optical filter 140 prevents an exposure of harmful radiation of the sun to the eye of the user, while enabling the user to see/view the solar eclipse. In alternate embodiments, the optical filter 140 may be a filter that meets specific ISO and ASTM standards for eye safety, which may be selected based on the specific application of the viewing device 100.

Additionally, or optionally, the viewing device 100 may include a light filter 150 attached to the panel 102 and arranged covering the imaging aperture 122. Similar to the optical filter 140, the light filter 150 completely covers the imaging aperture 122 and is arranged such that a light incident on the light filter 150 is transmitted through the light filter 150 to the camera sensor 204 via the imaging aperture 122. In an embodiment, the light filter 150 is at least partially transparent so that at least part of light incident on the light filter 150 may be transmitted through the light filter 150, and which affects at least one of the spectrum and the polarization state of such light incident on and propagating through the light filter 150. In one embodiment, the light filter 150 may be a polarization filter selectively transmitting the incident light on the basis of its polarization state. The polarization filter may be, for example, a linear polarization filter transmitting linearly polarized light, a circular polarization filter producing circularly polarized transmitted light, or a cross polarization filter changing the polarization orientation of incident, linearly polarized light perpendicular to the initial orientation. Accordingly, the light filter 150 may be a solar filter and is selected such that the light filter 150 facilitates an imaging of the solar eclipse.

Moreover, to ensure an authentication of the viewing device 100, the viewing device 100 may include an identifier, for example, a first identifier 152, arranged on the panel 102. In an embodiment, the first identifier 152 may be a watermark, a color code, a barcode, a QR code, or any other suitable identifier that facilitates in recognizing the authenticity of the viewing device 100 by the user. The user may check the authenticity of the viewing device 100 by comparing the watermark or the color code with a predefined watermark and the color code. Accordingly, the user may ascertain the authenticity of the viewing device 100 without using any additional equipment or internet from a remote location. In some embodiments, the user may scan the barcode or the QR code and compares the code with the pre-recorded codes available at a manufacturer website or an online database, and accordingly check the authenticity of the viewing device 100.

Additionally, the viewing device 100 may include a second identifier 154 to check an authenticity of the optical filter 140. For so doing, the second identifier 154 may be arranged/printed on the optical filter 140, and may be a watermark, a color code, a barcode, a QR code, or any other suitable identifier in recognizing the authenticity of the optical filter 140 by the user. The user may check the authenticity of the optical filter 140 by comparing the watermark or the color code with a predefined watermark and the color code. Accordingly, the user may ascertain the authenticity of the optical filter 140 without using any additional equipment or internet at a remote location. In some embodiments, the user may scan the barcode or the QR code and compares the code with the pre-recorded codes available at a manufacturer website or an online database, and accordingly check the authenticity of the optical filter 140.

For simultaneously viewing the solar eclipse and capturing the image of the solar eclipse, the user may engage the imaging device 200, such as, the smartphone 202, to the panel 102 via the engagement member 130. The user may engage the smartphone 202 with the panel 102 such that the camera sensor 204 is aligned with the imaging aperture 122 so that a light transmitted through the light filter 150 is received by the camera sensor 204. Subsequently, the user may hold the viewing device 100 and position the viewing device 100 with the smartphone 200 in front of user's face such that one eye (right eye) of the user is aligned with the viewing window 120. Accordingly, a light transmitted through the optical filter 140 and the viewing window 120 may reach the eye of the user. It may be appreciated that the user may position the panel 102 (i.e., the viewing device 100) such that the panel 102 is arranged directly in front of both the eyes of the user and the display 206 is arranged in front of the other eye (i.e., left eye) of the user. In this manner, the panel 102 (i.e., the viewing device 100) prevents both the eyes of the user from a direct exposure of the solar radiations (parasitic rays) during solar eclipse and enables the viewing of the solar eclipse by the eyes of the user and capturing image of the solar eclipse by the camera sensor 204 (i.e., smartphone 202) simultaneously.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A viewing device adapted to support an imaging device having a camera sensor and a display to display an image captured by the camera sensor, the viewing device comprising:
   a panel having a first longitudinal end and a second longitudinal end and defining:
      an imaging aperture to facilitate a capture of an image, by the camera sensor, of a solar eclipse,
      a viewing window to facilitate a view, by one of the human eyes, of the solar eclipse, the viewing window is arranged distally from the first longitudinal end relative to the imaging aperture and is arranged laterally and longitudinally offset from the imaging aperture;
   a first optical filter attached to the panel and arranged covering the imaging aperture;
   a second optical filter, comprising optical characteristics differing from optical characteristics of the first optical filter, attached to the panel and arranged covering the viewing window to filter parasitic light rays; and
   an engagement member adapted to releasably engage with and support the imaging device and retain the imaging device with the panel such that the camera sensor is aligned with the imaging aperture,
      wherein the viewing device facilitates a simultaneous capturing of the image of the solar eclipse through the imaging aperture and the viewing of the solar eclipse through the viewing window.

2. The viewing device of claim 1 further including a first identifier disposed on the panel to enable an authentication of the viewing device.

3. The viewing device of claim 2, wherein the first identifier is one of a barcode, a QR code, a watermark, or a color code.

4. The viewing device of claim 1, wherein the optical filter includes a second identifier to enable an authentication of the optical filter.

5. The viewing device of claim 4, wherein the second identifier is one of a barcode, a watermark, a color code, or a QR code.

6. The viewing device of claim 1, wherein the engagement member includes an adhesive member to adhesively engage the imaging device with the panel.

7. A viewing device adapted to support an imaging device having a camera sensor and a display to display an image captured by the camera sensor, the viewing device comprising:
- a panel having a first longitudinal end and a second longitudinal end and defining
  - an imaging aperture to facilitate a capture of an image, by the camera sensor, of a solar eclipse,
  - a viewing window to facilitate a view, by one of the human eyes, of the solar eclipse, the viewing window is arranged distally from the first longitudinal end relative to the imaging aperture and is arranged laterally and longitudinally offset from the imaging aperture;
- a first optical filter attached to the panel and arranged covering the imaging aperture;
- a first identifier disposed on the panel to enable an authentication of the viewing device;
- a second optical filter, comprising optical characteristics differing from optical characteristics of the first optical filter, attached to the panel and arranged covering the viewing window to filter parasitic light rays; and
- an engagement member adapted to releasably engage with and support the imaging device and retain the imaging device with the panel such that the camera sensor is aligned with the imaging aperture,
- wherein the viewing device facilitates a simultaneous capturing of the image of the solar eclipse through the imaging aperture and the viewing of the solar eclipse through the viewing window.

8. The viewing device of claim 7, wherein the optical filter includes a second identifier to enable an authentication of the light filter.

9. The viewing device of claim 8, wherein the second identifier is one of a barcode, a watermark, a color code, or a QR code.

10. The viewing device of claim 7, wherein the engagement member includes an adhesive member to adhesively engage the imaging device with the panel.

11. The viewing device of claim 7, wherein the first identifier is one of a barcode, a QR code a watermark, or a color code.

* * * * *